2,938,031

17-CARBOXYALKYLATED 3-OXYGENATED 6-METHYLANDROSTEN-17-OL LACTONES AND INTERMEDIATES

Roy H. Bible, Jr., Morton Grove, and Robert R. Burtner, Skokie, Ill., assignors to G. D. Searle & Co., Chicago, Ill., a corporation of Delaware No Drawing. Filed Dec. 11, 1958, Ser. No. 779,531

10 Claims. (Cl. 260—239.55)

This invention relates to 17-carboxyalkylated 3-oxygenated 6-methylandrosten-17-ol lactones and processes for the manufacture thereof. More particularly, this invention relates to lactones of the formula

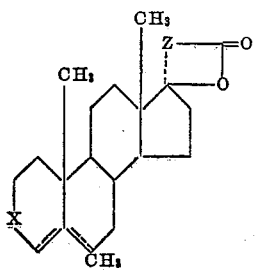

wherein Z is an alkylene or alkenylene radical, X is a carbonyl or hydroxymethylene radical, the 6-methyl substituent is either α or β, and—as will be apparent from the dotted line in rings A and B—there is a 4(5) or 5(6) double bond present. Among the radicals contemplated by Z in the formula, those which contribute at least 2 and fewer than 4 carbon atoms are preferred. Examples of such radicals are ethylene, vinylene, trimethylene, and propenylene groupings, and radicals derived therefrom by the replacement of hydrogen therein with 1 or more lower alkyl groupings.

Equivalent to the foregoing lactones for purposes of this invention are the corresponding hydroxy acids and their alkali salts, of the formula

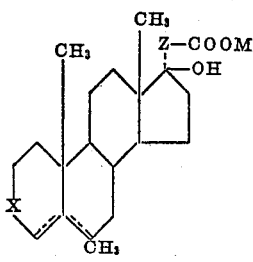

wherein X and Z are defined as before and M is hydrogen, an alkali metal, or the ammonium radical.

The lactones, hydroxy acids, and salts hereinabove described are useful because of their valuable pharmacological properties. For example, they are unusually potent diuretics, especially adapted to block the effect of desoxycorticosterone acetate on urinary sodium and potassium. It follows that the intermediates from which these diuretic products can be obtained are also useful.

The 6β-methyl compounds of this invention can be manufactured as follows: An appropriate 17α-carboxyalkylated androst-5-ene-3β,17β-diol of lactonic formula

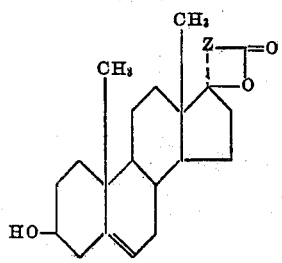

is reduced with lithium aluminum hydride to the corresponding triol, which is di-esterified (the 17β-hydroxyl being sterically hindered) to increase solubility and then converted to the 5,6-epoxy derivative with perbenzoic acid. The epoxide ring is opened and the ester linkages cleaved with methylmagnesium bromide to give the 6-methyl-3β,5α,17β,ω-tetraol, which lactonizes on chromic acid oxidation of the side chain hydroxyl to carboxyl. From the resultant material, the elements of water in the 5 and 6 positions are removed by heating with finely-divided (200-mesh) magnesia-silica gel in a solvent medium. The 6β-methyl-3-oxo products of the invention thus obtained

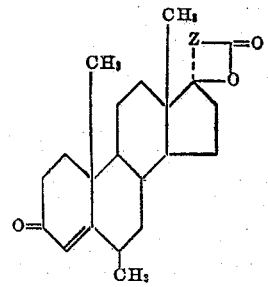

are converted to the 3β-hydroxy-6β-methyl products hereof by reduction with sodium borohydride.

The 6-methyl-5-en-3β-ols of this invention can be manufactured as follows: An appropriate 17α-alkynyl-6-methylandrost-5-ene-3β,17β-diol

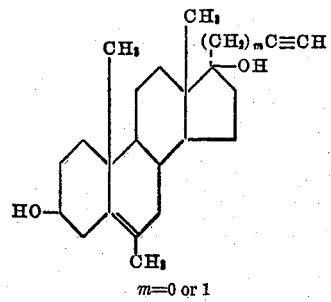

$m=0$ or $1$ derived by condensation of 3β-hydroxy-6-methylandrost-5-en-17-one with acetylene or propargyl bromide, is converted to the corresponding 17α-carboxyalkynyl compound by seriatim treatment with the Grignard reagent and carbon dioxide. Selective hydrogenation of the acid thus obtained affords the 3β-hydroxy-6-methyl products aforesaid, those wherein Z is an alkenylene radical being produced when the hydrogenation is conducted in the presence of a catalyst of the order of activity of palladium supported on calcium carbonate, and those wherein Z is saturated resulting from the use of a more active catalyst such as palladium on charcoal.

The 6α-methyl-3-oxo products of this invention can be

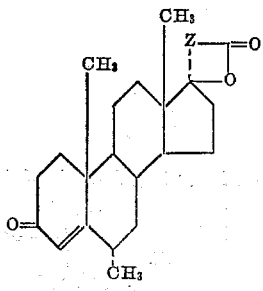

manufactured from the corresponding 3β-hydroxy-6β-methyl products by Oppenauer oxidation, and in turn can be reduced to the 3β-hydroxy-6α-methyl products hereof

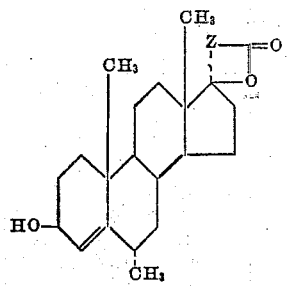

by reduction with sodium borohydride.

Those skilled in the art will readily appreciate that the described lactones, on contact with aqueous alkali, are converted to salts of the corresponding hydroxy acids, from which the free acids can be obtained by a critically brief exposure to a proton source. Prolongation of the exposure time induces lactonization.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

Example 1

*3β,17β - dihydroxy - 17α-(3-hydroxypropyl)androst-5-ene.*—A mixture of 30 parts of lithium aluminum hydride and 700 parts of peroxide-free tetrahydrofuran is vigorously agitated for 1 hour, following which a solution of 82 parts of 17α-(2-carboxyethyl)androst-5-ene-3β,17β-diol lactone in 360 parts of tetrahydrofuran is added during 2½ hours with continued agitation. Agitation is maintained while the resulting mixture is heated at the boiling point under reflux for 16 hours and then successively and cautiously is diluted with 180 parts of ethyl acetate, 200 parts of water, and 1000 parts of 10% hydrochloric acid. The solid which precipitates is collected and purified by successive trituration with 1500 parts of chloroform, 750 parts of chloroform, 800 parts of methanol, and 750 parts of chloroform. The resultant product is stripped of residual solvent by drying at 65°. Infrared analysis of this material in a potassium bromide disc shows no absorption in the 5–6μ region, confirming reduction of the carbonyl group in the starting lactone. The product thus obtained is 3β,17β-dihydroxy-17α-(3-hydroxypropyl)androst-5-ene, of the formula

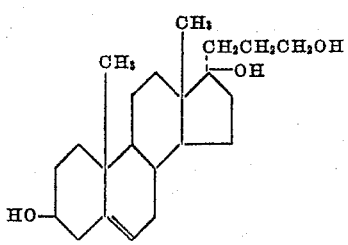

Example 2

*3β-acetoxy - 17α - (3-acetoxypropyl)androst-5-en-17β-ol.*—A mixture of 81 parts of 3β,17β-dihydroxy-17α-(3-hydroxypropyl)androst-5-ene, 560 parts of pyridine, and 96 parts of acetic anhydride is heated at 85° for 30 minutes and then filtered hot. The filtrate is poured into 3000 parts of hot water, precipitating a granular solid which is collected and washed with water. This solid is 3β-acetoxy-17α-(3-acetoxypropyl)androst-5-en-17β-ol which, dried at 65° for 18 hours, is adapted to use in the procedure of Example 3 hereinafter without further processing. The product has the formula

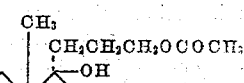

Example 3

*3β - acetoxy-17α-(3-acetoxypropyl)-5α,6α-epoxyandrostan-17β-ol.*—A solution of 69 parts of perbenzoic acid in approximately 850 parts of benzene is added over a period of 5 minutes to a solution of 198 parts of 3β-acetoxy - 17α - (3-acetoxypropyl)androst-5-en-17β-ol in 1350 parts of benzene. The resultant mixture is vigorously agitated and then let stand for 3 hours. It is next washed with aqueous 5% sodium carbonate and, finally, with water, the latter operation being continued until the washings are neutral. Solvent is removed by distillation, and the residue is purified by recrystallization from a mixture of chloroform and hexane. 3β-acetoxy-17α-(3-acetoxypropyl)-5α,6α-epoxyandrostan-17β-ol is obtained thus in the form of platelets melting at 140.5–142.5°. The product shows a specific rotation of −68°, and has the formula

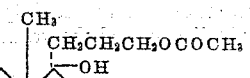

Example 4

*3β,5α,17β - trihydroxy-17α - (3-hydroxypropyl)-6β-methylandrostane.*—A solution of approximately 30 parts of 3β-acetoxy-17α-(3-acetoxypropyl)-5α,6α-epoxyandrostan-17β-ol in 180 parts of peroxide-free tetrahydrofuran is slowly added, with agitation, to a mixture of 286 parts of methylmagnesium bromide and 560 parts of anhydrous ether. The resultant mixture is freed of ether by distillation to a vapor temperature of 59° and then heated at the boiling point under reflux for 18 hours, agitation being maintained throughout. The mixture is thereupon chilled and poured onto 2000 parts of ice. The resultant mixture, in turn, is extracted with dichloromethane. The dichloromethane extract is washed with 10% hydrochloric acid and then with water until the aqueous washings are neutral. Solvent is removed by distillation, and the residue is recrystallized from aqueous methanol to give 3β,5α,17β-trihydroxy-17α-(3-hydroxypropyl)-6β-methylandrostane, melting in the range 218–223°. The product has the formula

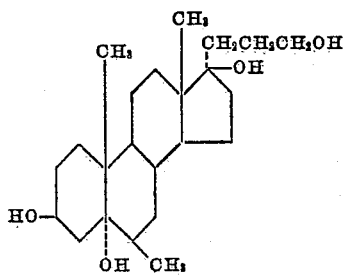

Example 5

*17α(2-carboxyethyl)-5α,17β - dihydroxy - 6β-methylandrostan-3-one lactone.*—To a mixture of 96 parts of 3β,5α,17β - trihydroxy-17α-(3-hydroxypropyl)-6β-methylandrostane in 4000 parts of acetone is cautiously added, with vigorous agitation, a solution of 94 parts of chromium trioxide and 148 parts of concentrated sulfuric acid in 350 parts of water. Agitation is continued for 3 minutes after the addition is complete, at which point excess chromium trioxide is decomposed by the addition of 240 parts of 2-propanol. The mixture is then poured into a large volume of water, and the solid which precipitates is collected on a filter. The material thus obtained is 17α - (2 - carboxyethyl)-5α,17β-dihydroxy-6β-methylandrostan-3-one lactone which, recrystallized from methanol, is obtained as platelets melting in the range 237–242°. The product has a specific rotation of −25° and is characterized by peaks in the infrared spectrum at 5.65, 5.83, and 10.84μ. The product has the formula

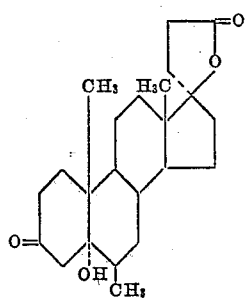

Example 6

*17α - (2-carboxyethyl)-17β-hydroxy-6β-methylandrost-4-en-3-one lactone.*—A solution of 2 parts of 17α-(2-carboxyethyl) - 5α,17β-dihydroxy-6β-methylandrostan-3-one lactone in 360 parts of benzene is heated at the boiling point with agitation under reflux in the presence of 20 parts of 200-mesh magnesia-silica gel for 4 hours. (The latter material is marketed under the trade name Florisil.) The gel is then filtered out and washed with ethyl acetate, and the resultant filtrate and washings are combined and stripped of solvent by vacuum distillation. The residue is a crystalline solid which recrystallizes from aqueous acetone as a feather-like material melting at 189.5–191.5°. This material is 17α-(2-carboxyethyl)-17β-hydroxy-6β-methylandrost-4-en-3-one lactone. It shows a specific rotation of +21° and has the formula

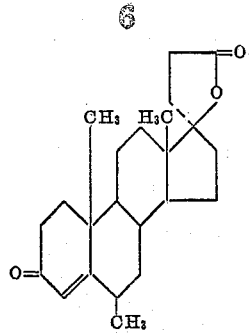

Example 7

*17α - (2 - carboxyethyl)-6β-methylandrost-4-ene-3β,17β-diol lactone.*—A solution of 5 parts of sodium borohydride in 200 parts of 95% ethanol is added to a solution of 6 parts of 17α-(2-carboxyethyl)-17β-hydroxy-6β-methylandrost-4-en-3-one lactone in 700 parts of 95% ethanol. The resultant mixture is let stand for 45 minutes, whereupon unreacted borohydride is decomposed by cautious addition of a solution of 80 parts of acetic acid in 300 parts of water. The mixture is concentrated to about ½ volume by distillation and then diluted with approximately 3000 parts of water. The solid which separates on standing is filtered off and dried. The material thus obtained is the desired 17α-(2-carboxyethyl)-6β-methlandrost-4-ene-3β,17β-diol lactone, which is characterized by absorption bands in the infrared at 5.66 and 2.75μ. No appreciable absorption in the ultraviolet region from 200 to 300 mμ is observed. The product has the formula

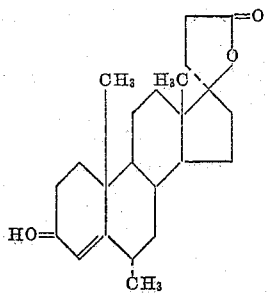

Example 8

*17α-carboxyethynyl - 6 - methylandrost - 5-ene-3β,17β-diol.*—A solution of approximately 25 parts of 17α-ethynyl-6-methylandrost-5-ene-3β,17β-diol [described by Grenville et al., J. Chem. Soc., 1957, 4111] in 225 parts of tetrahydrofuran is added with agitation during a 10 minute period to a solution of 89 parts of methylmagnesium bromide in 175 parts of ether diluted with 630 parts of tetrahydrofuran. Agitation is maintained for 20 hours while the reaction mixture is heated at the boiling point under reflux, whereupon carbonation of the Grignard complex thus produced is achieved by continued and vigorous agitation for 24 hours under an atmosphere of carbon dioxide. The resultant gray suspension is poured into an ice-cold solution of 98 parts of sulfuric acid in 1500 parts of water, at which point solvent is removed by vacuum distillation. Insoluble solids are collected on a filter, rinsed free of mineral acid with water, and dried. The product thus obtained is the desired 17α-carboxyethynyl-6-methylandrost-5-ene-3β,17β-diol, which is further purified by suspending for 5 minutes in 115 parts of boiling chloroform, filtering hot, and rinsing with two 40-part portions of boiling chloroform. The product melts at approximately 225° (with decomposition) and has the formula

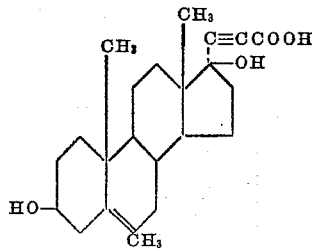

*Example 9*

A. *17α - (2 - carboxyethyl) - 6 - methylandrost - 5 - ene-3β,17β-diol.*—A solution of 373 parts of 17α-carboxyethynyl-6-methylandrost-5-ene-3β,17β-diol in 4400 parts of anhydrous ethanol containing 102 parts of triethylamine is hydrogenated at 45 p.s.i. in the presence of 37 parts of 5% palladium on charcoal catalyst until 4 parts of hydrogen is absorbed. The mixture is then filtered and the filtrate is concentrated to ½ volume by vacuum distillation. The residual solution is poured into 17,300 parts of water containing 308 parts of concentrated hydrochloric acid. The finely-divided white solid which precipitates is collected on a filter, washed thereon with water, and dried. This material is the desired 17α - (2 - carboxyethyl) - 6 - methylandrost - 5 - ene - 3β,17β-diol, which melts in the range 160–170° with loss of water. The product has the formula

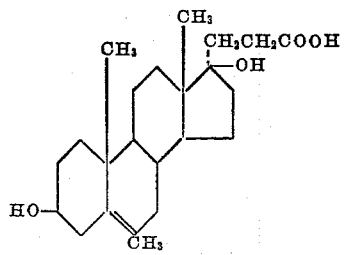

B. *17α - (2 - carboxyethyl) - 6 - methylandrost - 5 - ene-3β,17β-diol lactone.*—To a suspension of 25 parts of the hydroxy acid of the preceding part A of this example in 80 parts of methanol is added 10 parts of a 10% solution of hydrogen chloride. The solid dissolves in about 3 minutes, and the resultant solution is thereupon immediately poured into 1000 parts of water. The desired lactone precipitates as a tacky material which is collected on a filter, rinsed thereon with water, and dried. Crystallization from a mixture of ethyl acetate and isopropyl ether affords 17α-(2-carboxyethyl)-6-methylandrost-5-ene-3β,17β-diol lactone as fine white needles melting at 152–154°. The product has the formula

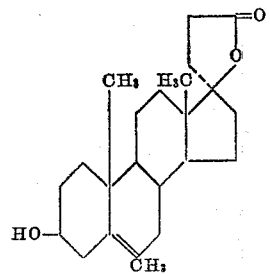

*Example 10*

*17α - (2 - carboxyethyl) - 17β - hydroxy - 6α - methylandrost-4-en-3-one lactone.*—To a solution of 20 parts of 17α - (2-carboxyethyl)-6-methylandrost-5-ene-3β,17β-diol in 540 parts of dry toluene at the boiling point under reflux is added, with agitation, a solution of 18 parts of aluminum isopropoxide in 225 parts of dry toluene. Heating at the boiling point with agitation is continued for 30 minutes, whereupon the reaction mixture is cooled, diluted with approximately 150 parts of saturated aqueous Rochelle salt solution, and steam-distilled until the distillate comes over free of oil. The distillation residue is cooled, acidified to pH 2.0, and extracted with chloroform. The choloroform extract is stripped of solvent by distillation, leaving a "glass" which is taken up in 80 parts of methanol. The methanol solution is diluted with 10 parts of 10% hydrochloric acid (to insure lactone formation). After 5 minutes, the solution is poured into 1000 parts of water; and the resultant mixture is extracted with ether. Evaporation of solvent leaves a light brown glass which is still further purified by chromatography on silica gel, using benzene and ethyl acetate as developing solvents. The 17α-(2-carboxyethyl)-17β-hydroxy-6α-methylandrost-4-en-3-one lactone thus obtained, on crystallization from a mixture of ethyl acetate and isopropyl ether, melts at approximately 149–150°. A 1% solution of the product in chloroform has a specific rotation of +64° and shows a maximum at 240 millimicrons in the ultraviolet spectrum, with a molar extinction coefficient of 16,570. The product has the formula

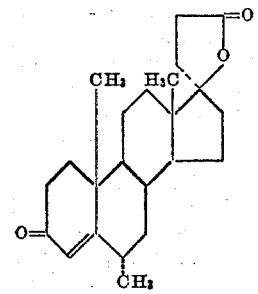

*Example 11*

*17α - (2 - carboxyethyl) - 6α - methylandrost - 4 - ene - 3β,17β-diol lactone.*—Using the technique of Example 7, but substituting 6 parts of 17α-(2-carboxyethyl)17β-hydroxy-6α-methylandrost-4-en-3-one lactone for the 6 parts of 17α - (2 - carboxyethyl)17β-hydroxy-6β-methylandrost-4-en-3-one lactone called for therein, one obtains 17α - (2 - carboxyethyl) - 6α - methylandrost - 4 - ene - 3β,17β-diol lactone, the formula of which is

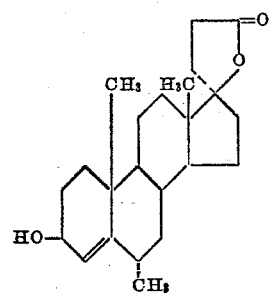

*Example 12*

*17α - (2 - carboxyvinyl) - 6 - methylandrost - 5 - ene - 3β,17β - diol lactone.*—A solution of approximately 176 parts of 17α - carboxyethynyl - 6 - methylandrost - 5 - ene - 3β,17β - diol in 4300 parts of dioxane containing 430 parts of pyridine is agitated with hydrogen at room temperatures and atmospheric pressures in the presence of approximately 57 parts of 5% palladium supported on calcium carbonate. When 1 part of hydrogen has been absorbed, the reduction is stopped and the reaction mixture thereupon filtered to remove catalyst. The bulk of the solvent is stripped by vacuum distillation, and the oily residue is thoroughly mixed with 1900 parts of 10% hydrochloric acid. The solid product which results is filtered off and crystallized from a mixture of ethyl acetate and isopropyl ether. The 17α-(2-carboxyvinyl)-6- methylandrost - 5 - ene - 3β,17β - diol lactone thus obtained has the formula

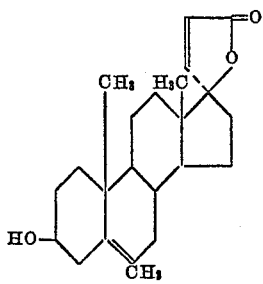

*Example 13*

17α - (2 - carboxyvinyl) - 17β - hydroxy - 6α - methylandrost - 4 - en - 3 - one lactone.—Substitution of 17α - (2 - carboxyvinyl) - 6 - methylandrost - 5 - ene - 3β,17β - diol lactone for the 17α - (2 - carboxyethyl) - 6 - methylandrost - 5 - ene - 3β,17β - diol lactone called for in Example 10 affords, by the procedure therein described, 17α - (2 - carboxyvinyl) - 17β - hydroxy - 6α - methylandrost - 4 - en - 3 - one lactone, which has the formula

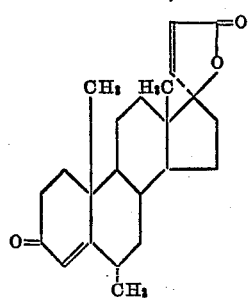

What is claimed is:
1. A compound of the formula

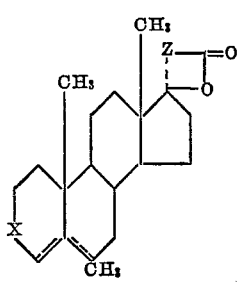

wherein Z is selected from the group consisting of ethylene and vinylene radicals, and X is selected from the group consisting of carbonyl and β-hydroxymethylene radicals.

2. A compound of the formula

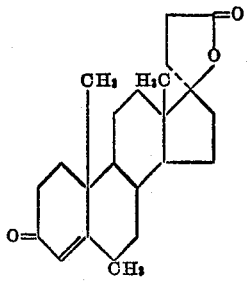

3. 17α - (2 - carboxyethyl) - 6β - methyl - 17β - hydroxyandrost - 4 - en - 3 - one lactone.
4. 17α - (2 - carboxyethyl) - 17β - hydroxy - 6α - methylandrost - 4 - en - 3 - one lactone.
5. A compound of the formula

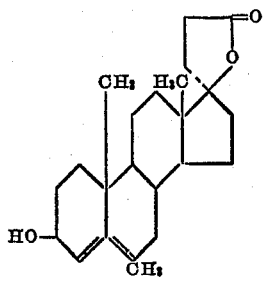

6. 17α - (2 - carboxyethyl) - 6 - methylandrost - 5 - ene - 3β,17β - diol lactone.
7. 17α - (2 - carboxyethyl) - 6β - methylandrost - 4 - ene - 3β,17β - diol lactone.
8. 3β - acetoxy - 17α - (3 - acetoxypropyl) - 5α,6α - epoxyandrostan - 17β - ol.
9. 17α - (2 - carboxyethyl) - 5α,17β - dihydroxy - 6β - methylandrostan - 3 - one lactone.
10. 3β,5α,17β - trihydroxy - 17α - (3 - hydroxypropyl) - 6β - methylandrostane.

References Cited in the file of this patent
UNITED STATES PATENTS
2,705,712    Cella _____ Apr. 5, 1955